United States Patent
Takeya et al.

(10) Patent No.: US 11,935,225 B2
(45) Date of Patent: Mar. 19, 2024

(54) PROCESSING DEVICE, WELDING SYSTEM, PROCESSING METHOD, AND STORAGE MEDIUM

(71) Applicant: KABUSHIKI KAISHA TOSHIBA, Tokyo (JP)

(72) Inventors: Kohei Takeya, Yokohama (JP); Tetsuo Sakai, Taito (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 17/655,066

(22) Filed: Mar. 16, 2022

(65) Prior Publication Data
US 2023/0093558 A1 Mar. 23, 2023

(30) Foreign Application Priority Data
Sep. 21, 2021 (JP) .................. 2021-153366

(51) Int. Cl.
*G06T 7/00* (2017.01)
*B23K 9/095* (2006.01)
(Continued)

(52) U.S. Cl.
CPC .......... *G06T 7/0008* (2013.01); *B23K 9/0956* (2013.01); *G06T 7/13* (2017.01); *H04N 23/56* (2023.01); *G02B 5/20* (2013.01)

(58) Field of Classification Search
CPC ...................... G06T 7/0008; G06T 7/13; G06T 2207/30108; G06T 7/0004; B23K 9/0956;
(Continued)

(56) References Cited

U.S. PATENT DOCUMENTS

2005/0029326 A1* 2/2005 Henrikson ........... B23K 9/0956
228/103
2005/0103766 A1* 5/2005 Iizuka .................. B23K 9/0216
219/124.34
(Continued)

FOREIGN PATENT DOCUMENTS

JP 2002205166 A * 7/2002
JP 2009-107024 A 5/2009
(Continued)

OTHER PUBLICATIONS

Kinoshita et al. (Machine translation of JP 2002205166 A) (Year: 2002).*

*Primary Examiner* — Christopher S Kelley
*Assistant Examiner* — Ana Picon-Feliciano
(74) *Attorney, Agent, or Firm* — Oblon, McClelland, Maier & Neustadt, L.L.P.

(57) ABSTRACT

According to one embodiment, a processing device performs at least determination processing of determining a state of a weld by using a first image of at least a portion of a weld pool. The state includes a first state, and a second state that is more unstable than the first state. The determination processing determines the weld to be in the second state when ripples exist in the weld pool. The processing device corrects a condition of the weld when the weld is determined to be in the second state. The processing device does not correct the condition of the weld when the weld is determined to be in the first state.

13 Claims, 14 Drawing Sheets

(51) Int. Cl.
*G02B 5/20* (2006.01)
*G06T 7/13* (2017.01)
*H04N 23/56* (2023.01)

(58) Field of Classification Search
CPC .... B23K 9/095; B23K 9/0953; H04N 5/2256; H04N 23/555; H04N 23/56; G02B 5/20
USPC .......................................................... 348/98
See application file for complete search history.

(56) References Cited

U.S. PATENT DOCUMENTS

| | | | |
|---|---|---|---|
| 2012/0243771 A1* | 9/2012 | Matsumoto | G01N 29/44 382/141 |
| 2017/0151634 A1* | 6/2017 | Witney | G01N 29/04 |
| 2020/0357112 A1 | 11/2020 | Sakai et al. | |
| 2021/0318673 A1* | 10/2021 | Kitchen | G06T 7/13 |

FOREIGN PATENT DOCUMENTS

| JP | 5279479 B2 | 9/2013 |
| JP | 2020-171967 A | 10/2020 |
| JP | 2020-182966 A | 11/2020 |
| JP | WO 2021/049610 A1 | 3/2021 |

\* cited by examiner

PROCESSING DEVICE, WELDING SYSTEM, PROCESSING METHOD, AND STORAGE MEDIUM

CROSS-REFERENCE TO RELATED APPLICATIONS

This application is based upon and claims the benefit of priority from Japanese Patent Application No. 2021-153366, filed on Sep. 21, 2021; the entire contents of which are incorporated herein by reference.

FIELD

Embodiments described herein relate generally to a processing device, a welding system, a processing method, and a storage medium.

BACKGROUND

It is desirable to develop technology that can suppress defects of a weld.

DETAILED DESCRIPTION

Figure 1:
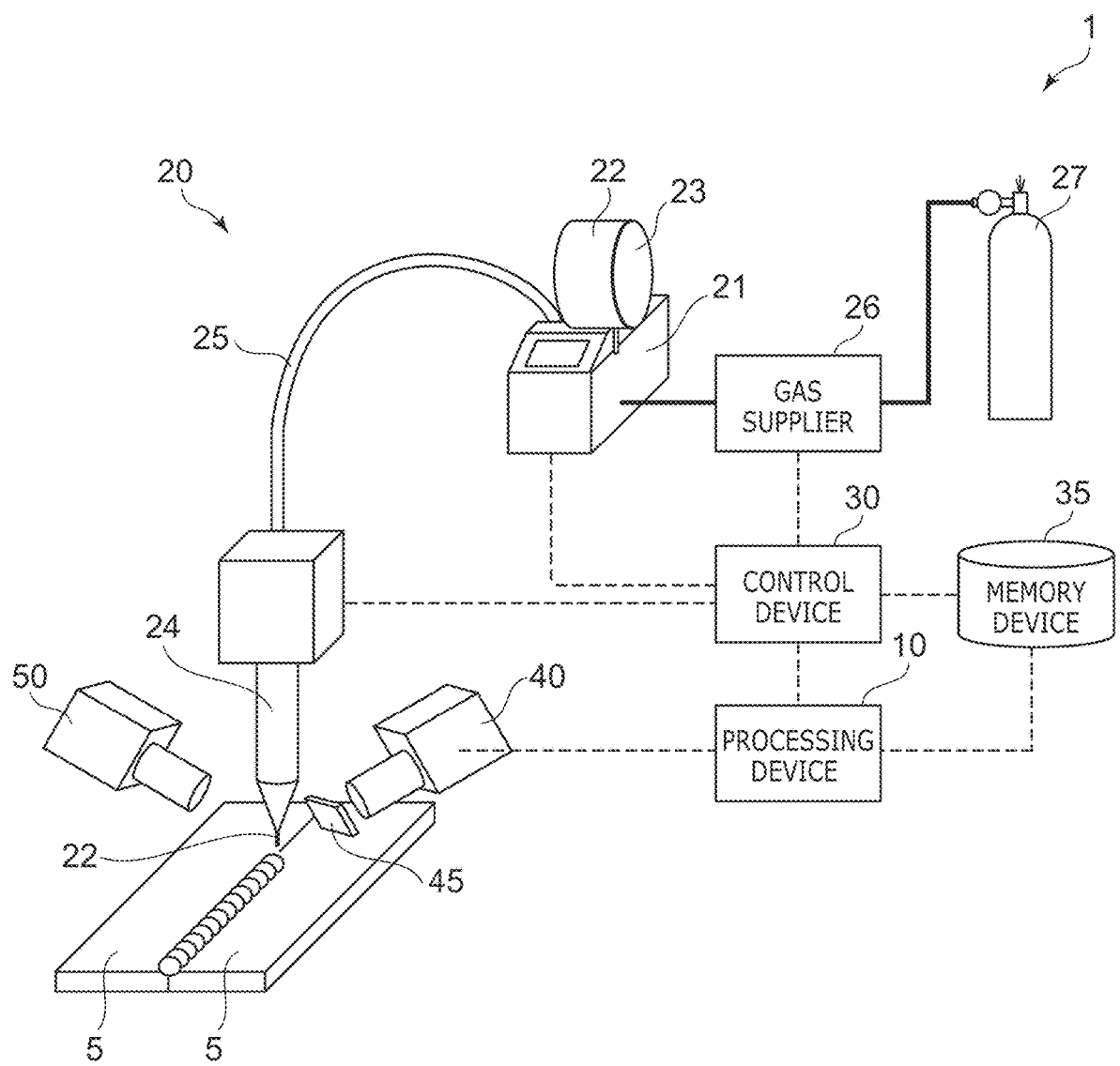
FIG. 1 is a schematic view showing a welding system according to an embodiment.

According to one embodiment, a processing device performs at least determination processing of determining a state of a weld by using a first image of at least a portion of a weld pool. The state includes a first state, and a second state that is more unstable than the first state. The determination processing determines the weld to be in the second state when ripples exist in the weld pool. The processing device corrects a condition of the weld when the weld is determined to be in the second state. The processing device does not correct the condition of the weld when the weld is determined to be in the first state.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

FIG. 1 is a schematic view showing a welding system according to an embodiment.

The welding system 1 includes a processing device 10, a welding device 20, a control device 30, a memory device 35, an imaging device 40, and lighting 50.

The welding device 20 joins two or more members 5 by welding. For example, the welding device 20 performs arc welding. Specifically, arc welding is tungsten inert gas (TIG) welding, metal inert gas (MIG) welding, metal active gas (MAG) welding, carbon dioxide gas arc welding, etc. An example in which the welding device 20 performs MAG welding or MIG welding is described herein.

As shown in FIG. 1, the welding device 20 includes a wire supplier 21, a wire 22, a wire coil 23, a torch 24, a tube 25, a gas supplier 26, and a gas source 27.

The wire supplier 21 includes the wire coil 23 on which the wire 22 (a consumable electrode) is wound. The wire supplier 21 supplies the wire 22 of the wire coil 23 to the torch 24 via the tube 25.

The gas supplier 26 is connected with the gas source 27 and supplies a shielding gas stored in the gas source 27 to the torch 24. In the illustrated example, the shielding gas is supplied to the torch 24 via the wire supplier 21 and the tube 25. An inert gas (e.g., argon) is used as the shielding gas. When MAG welding is performed, the shielding gas may include an active gas such as carbon dioxide gas, etc., in addition to the inert gas.

The wire 22 and the shielding gas are supplied to the torch 24. The wire 22 protrudes toward the member 5 at the tip of the torch 24. The torch 24 emits a jet of the supplied shielding gas at the periphery of the wire 22.

The control device 30 controls the components of the welding device 20. Specifically, the control device 30 controls the supply rate of the wire from the wire supplier 21, the flow rate of the shielding gas from the gas supplier 26, the potential of the tip of the wire 22, the potential of the members 5, the current flowing through the tip of the wire 22, the current waveform, etc. For example, the control device 30 controls the potentials of the members 5 and the wire 22 so that the wire 22 is positive (+) and the members 5 are negative (−).

The memory device 35 stores data necessary for welding. For example, the memory device 35 stores welding parameters such as the supply rate of the wire, the flow rate of the shielding gas, the voltage value and the current value of the weld, the current waveform, etc. The control device 30 causes the welding device 20 to perform the welding according to a preset welding parameter.

The imaging device 40 images the weld pool when welding and acquires an image (a still image). The imaging device 40 may acquire a video image. In such a case, a still image is cut out from the video image. The imaging device 40 is, for example, a camera that includes a CMOS image sensor or a CCD image sensor.

The lighting 50 irradiates light on the weld pool when welding. The lighting 50 includes a light-emitting diode or a lamp. The lighting 50 may emit laser light. The wavelength region of the light emitted from the lighting 50 is arbitrary. As an example, the lighting 50 emits infrared light. The lighting 50 may be omitted if the image that is obtained can be utilized in the determination of the state of the weld described below without the weld pool being illuminated by the lighting 50.

An optical filter 45 may be provided in the optical path between the weld pool and the imaging device 40. The optical filter 45 selectively transmits only a prescribed wavelength region. The optical filter 45 also may be positioned in the optical path between the lighting 50 and the weld pool. For example, blow-out of the image due to the light emission of the arc can be suppressed by using the optical filter 45 that selectively transmits only infrared light. A band-pass filter can be used as the optical filter 45.

The processing device 10 determines the state of the stability of the weld based on the image acquired by the imaging device 40. For example, the processing device 10 determines whether the weld is in a first state and a second state. The weld is more unstable in the second state than in the first state. The state of the weld may be determined to be in one of three or more finer states that include the first and second states.

When the weld is determined to be in the second state, the processing device 10 corrects a preset welding parameter. The processing device 10 transmits the corrected welding parameter to the control device 30. The control device 30 welds the members 5 according to the corrected welding parameter. For example, the welding parameter includes the supply rate of the wire, the shielding gas flow rate, the voltage value, the current value, and the movement speed of the torch 24. The correction includes adjusting not less than one of these conditions.

Figure 2:
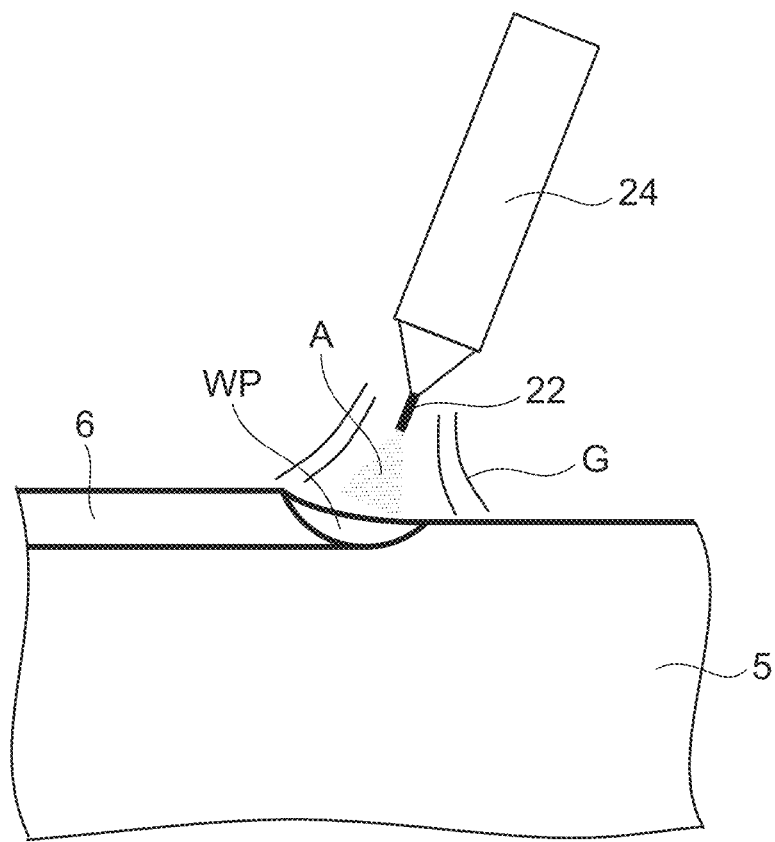
FIG. 2 is a schematic view showing the appearance of the weld.

FIG. 2 is a schematic view showing the appearance of the weld.

When welding as shown in FIG. 2, an arc A is generated between the tip of the wire 22 and the members 5. A shielding gas G is blown around the arc A. The heat of the arc A causes the wire 22 to melt and drop onto the members 5. Also, the heat of the arc A melts a portion of the members 5. A weld pool WP is formed of the melted wire 22 and the melted members 5. A solidified layer 6 is formed at the surfaces of the members 5 when the weld pool WP solidifies. The multiple members 5 are joined by the solidified layer 6 and become a joined body.

Figure 3:
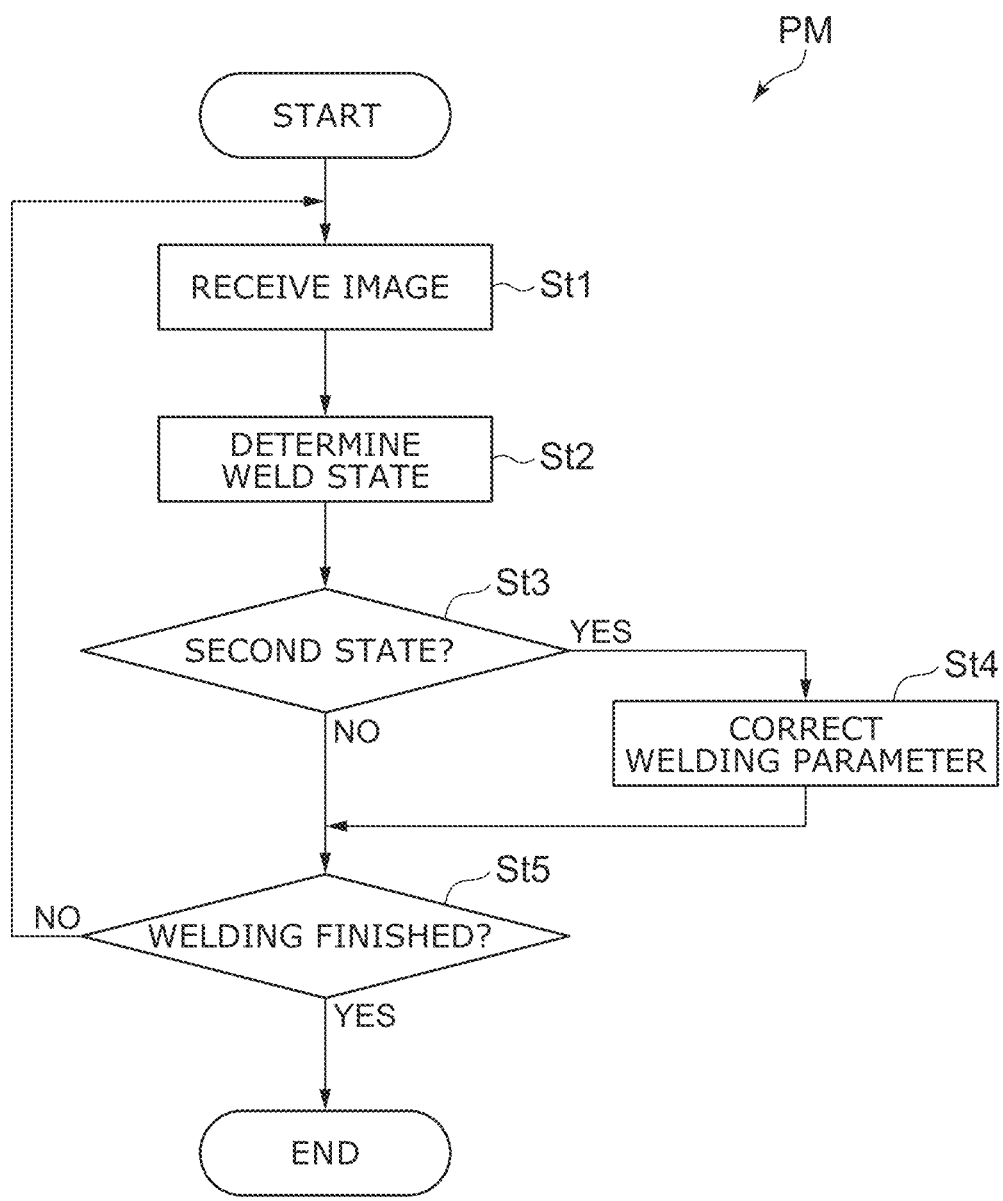
FIG. 3 is a flowchart showing a processing method according to the processing device according to the embodiment.

FIG. 3 is a flowchart showing a processing method according to the processing device according to the embodiment.

After starting the welding in a processing method PM, the processing device 10 receives an image of the weld pool WP (step St1. The image is acquired by the imaging device 40. The processing device 10 performs determination processing (step St2). In the determination processing, the state of the weld is determined using the image. The processing device 10 determines whether or not the weld is determined in step St2 to be in the second state (step St3). When the weld is determined to be in the second state in step St2, the processing device 10 corrects the welding parameter (step St4). When the weld is determined to be in the first state, the processing device 10 does not correct the welding parameter. The processing device 10 determines whether or not the welding is finished (step St5). When the welding is not finished, step SU is re-performed. The state of the weld when welding is repeatedly determined thereby. The welding parameter is appropriately corrected according to the determination result of the state.

The determination method of the weld state of step St2 will now be described with reference to specific examples. The determination of the weld state can include one of two determination methods described below. In the specific examples, a solid wire is used as the wire 22. Partially-plated SS400 is used as the members 5. The supply rate of the wire is 7 m/minute. The arc length correction is set to one of −3, 0, or 3. The arc length correction is a correction parameter related to the length of the arc length and is related to the voltage value, the current value, and the current waveform.

First Determination Method

Figure 4:
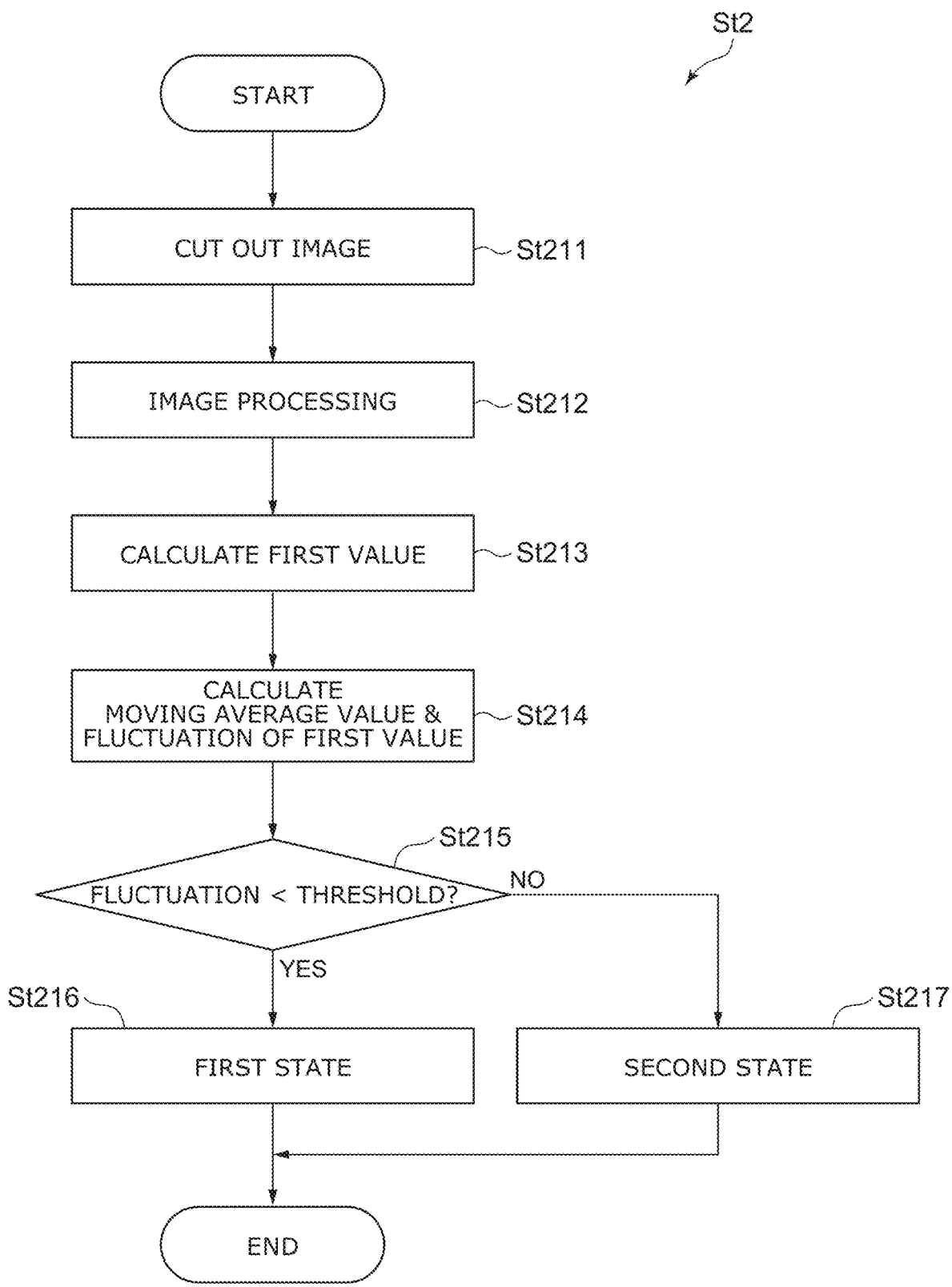
FIG. 4 is a flowchart showing a first determination method according to the processing device according to the embodiment.
Figure 5:
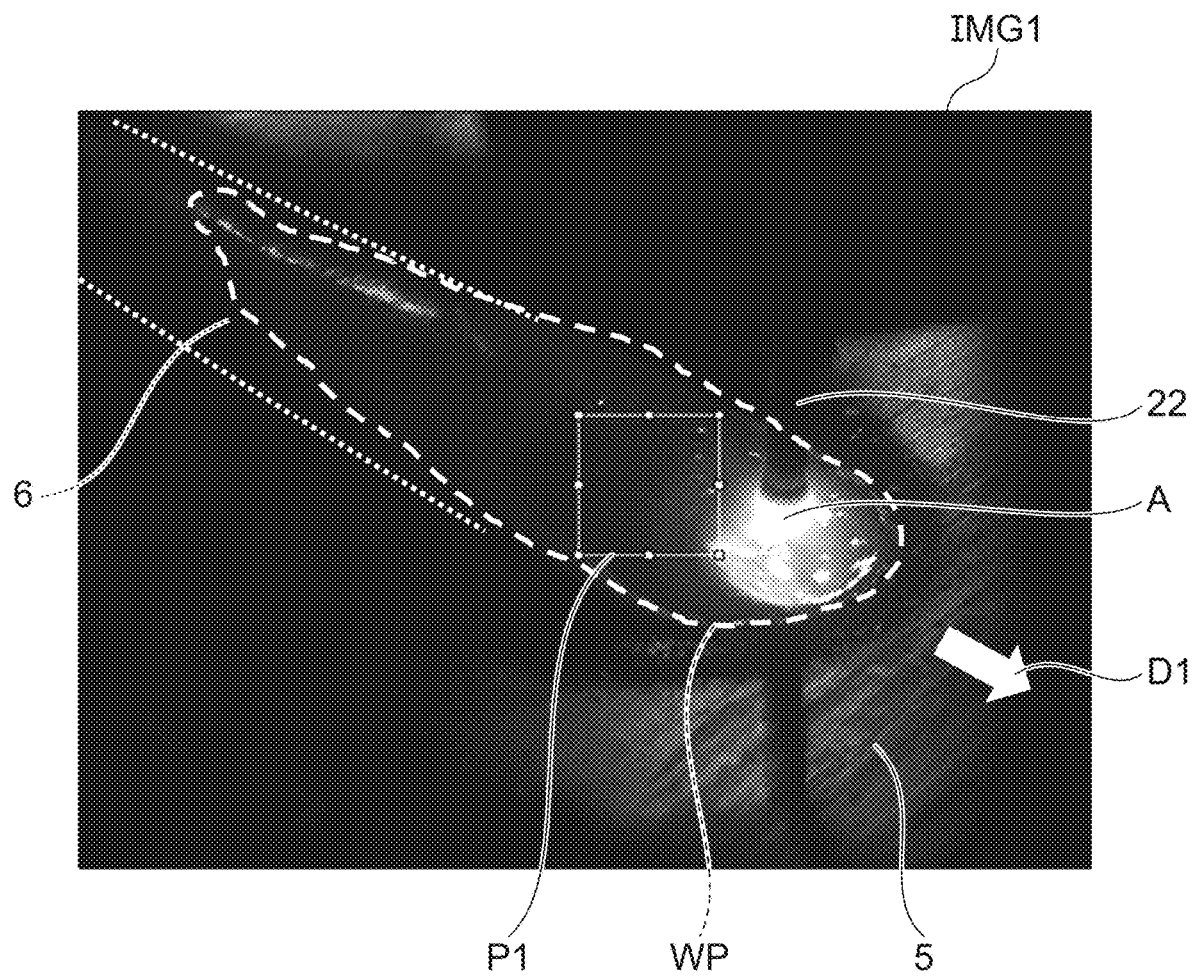
FIG. 5 is one example of an image acquired by an imaging device.
Figure 6:
FIG. 6 is one example of an image acquired by the imaging device.
Figure 7:
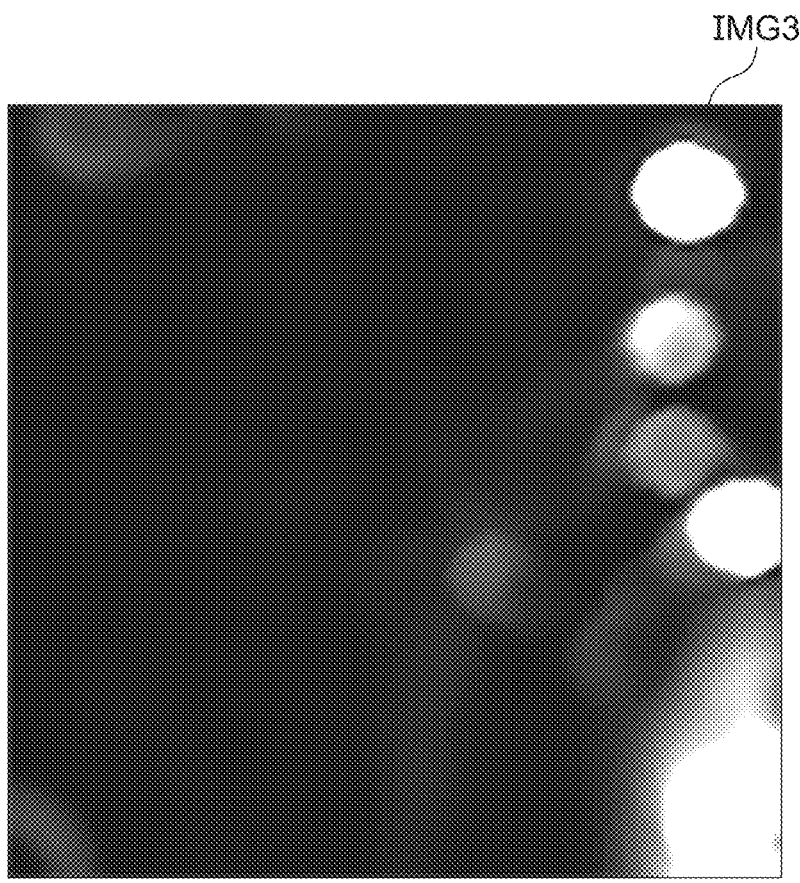
FIG. 7 is one example of an image acquired by the imaging device.

FIG. 4 is a flowchart showing a first determination method according to the processing device according to the embodiment. FIGS. 5 to 7 are examples of an image acquired by the imaging device.

In the first determination method, the weld state is determined based on a pixel value of the image. First, the processing device 10 cuts out a portion from the image acquired by the imaging device 40 (step St211). Specifically, the processing device 10 cuts out a portion of the weld pool positioned backward of the heat source.

FIG. 5 is an image IMG1 (an example of a second image) acquired by the imaging device 40. The wire 22, the arc A (the heat source), the weld pool WP, and the solidified layer 6 are imaged in the image IMG1. The wire 22 and the arc A move in a direction D1. Namely, the direction D1 is "frontward" when viewed from the position of the arc A. An image of a portion P1 positioned "backward", i.e., opposite to the direction D1, when viewed from the position of the arc A is cut out. FIG. 6 shows an image IMG2 (an example of a first image) of the portion P1 that is cut out.

The cut-out position is preset. Or, the cut-out position may be automatically set based on a recognition result of the wire 22, the arc A, the weld pool WP, etc., in the image.

The processing device 10 performs image processing of the image IMG2 (step St212). For example, the image processing includes edge enhancement (a dispersion filter) or edge detection. FIG. 7 shows an image IMG3 obtained by applying edge enhancement to the image IMG2.

The processing device 10 calculates a first value from multiple pixel values of the processed image (step St213). For example, the pixel value is the luminance when a grayscale image or an RGB image is acquired by the imaging device 40. The pixel value is the hue, the saturation, or the lightness when a HSV image is acquired by the imaging device 40. For example, the first value may be calculated as the average, the sum, or the weighted average of all of the pixel values included in the image. The first value may be calculated as the average, the sum, or the weighted average of a portion of the pixel values included in the image.

The processing device 10 calculates the moving average value and the fluctuation of the first value (step St214). In the processing method PM, images are repeatedly acquired when welding. The first value is calculated for each image. Therefore, the first value that is related to each image is calculated at each interval. The processing device 10 calculates the moving average value and the fluctuation over time.

As an example, the imaging device 40 acquires a video image of the weld pool at 500 fps. In other words, the imaging device 40 acquires 500 images per second. The processing device 10 calculates the first value for each image. The processing device 10 calculates the moving average value and the fluctuation at 0.2 second intervals (100 images). The standard deviation, the variance, or the mean squared error can be used as the fluctuation. The fluctuation can be used as an evaluation value for determining the state of the weld.

Figure 8:
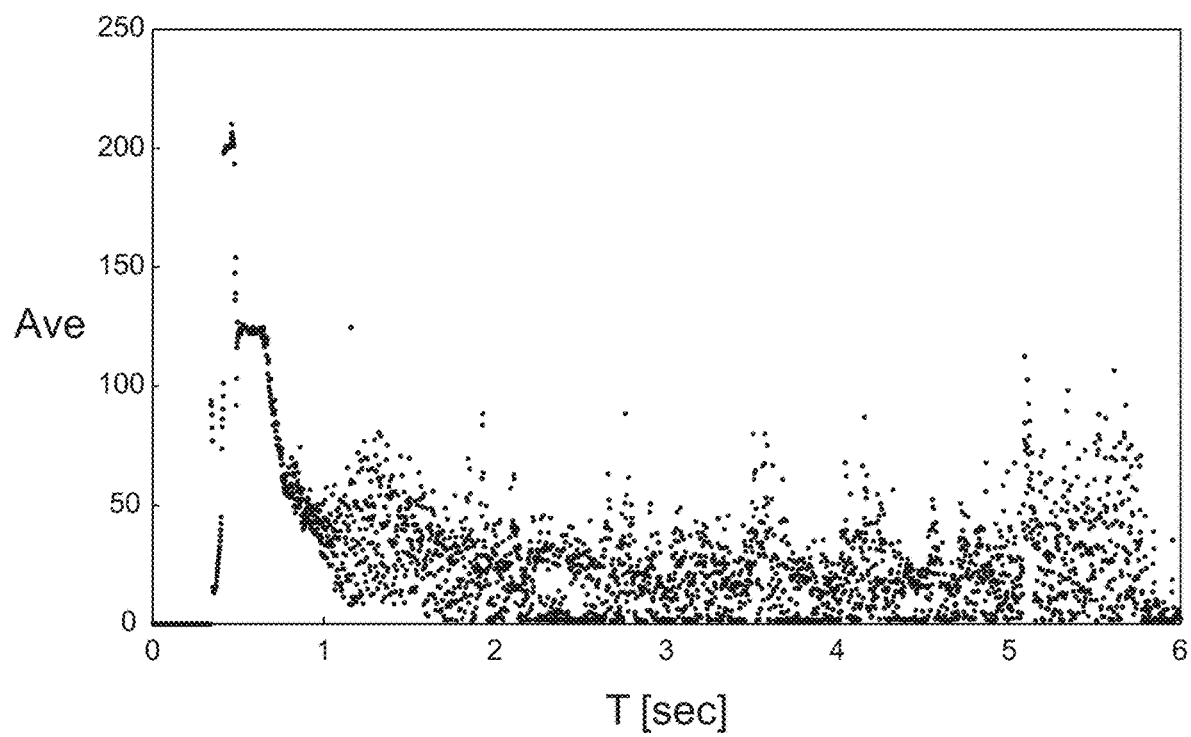
FIG. 8 is a graph illustrating the fluctuation of the moving average value of the pixel values of the images.
Figure 9:
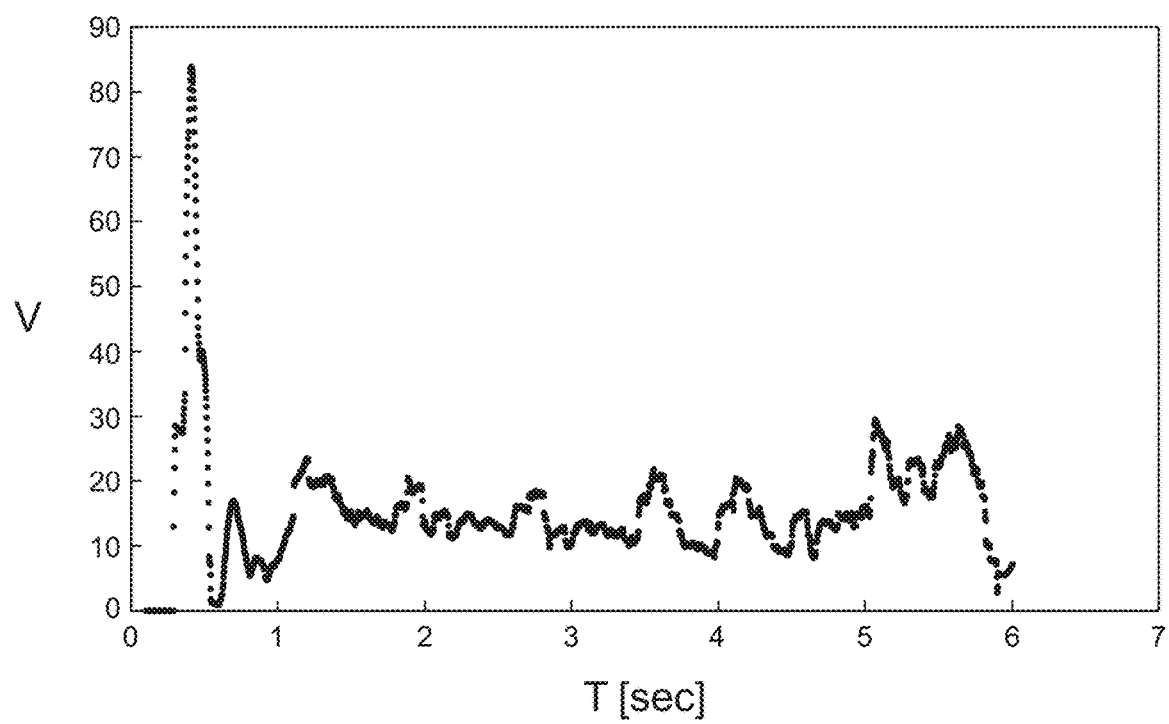
FIG. 9 is a graph illustrating the fluctuation of the moving average value of the pixel values.
Figure 10:
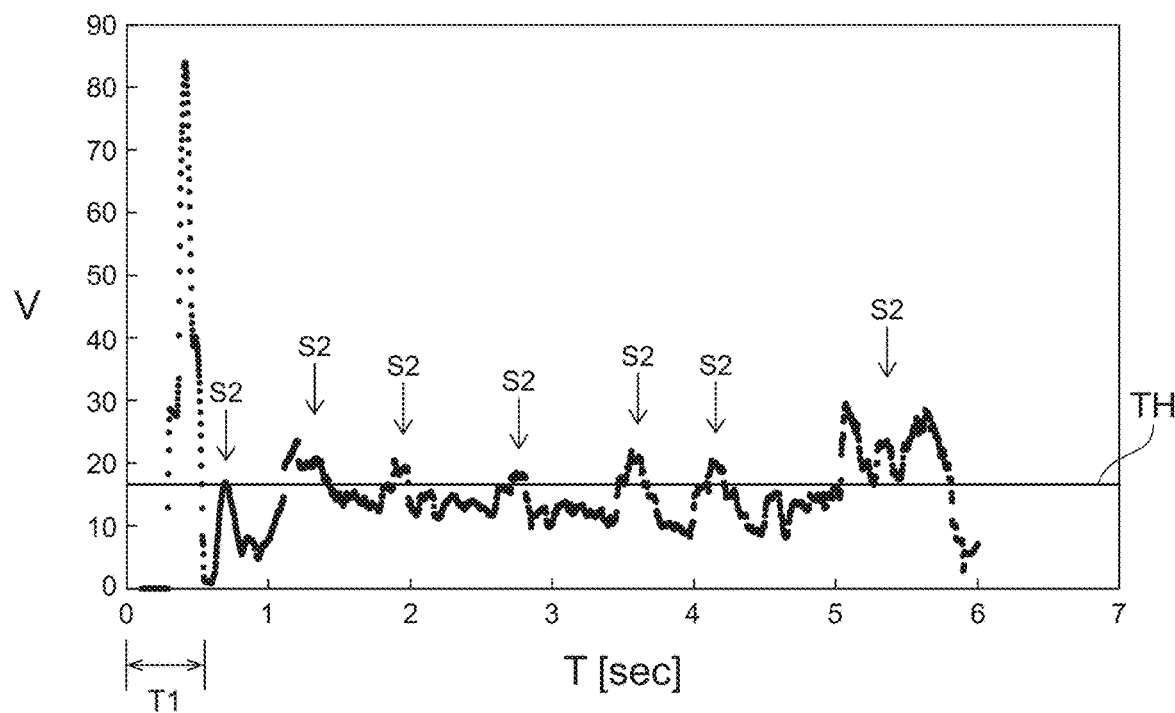
FIG. 10 is a graph illustrating the fluctuation of the moving average value of the pixel values.

FIG. 8 is a graph illustrating the fluctuation of the moving average value of the pixel values of the images. FIGS. 9 and 10 are graphs illustrating the fluctuation of the moving average value of the pixel values.

In FIG. 8, the horizontal axis is a time T (seconds). The vertical axis is an average value Ave of the pixel values of the images. In FIGS. 9 and 10, the horizontal axis is the time T (seconds). The vertical axis is a fluctuation V. The images that are used to generate the graphs of FIGS. 8 to 10 are RGB images to which edge enhancement is applied. The range of the pixel values in each image is 0 to 255.

In the example of FIG. 8, the arc is generated and the welding is started at the vicinity of 0.3 seconds. From 0.3 seconds to 0.8 seconds, the average value Ave greatly increases and then decreases. Thereafter, the average value Ave fluctuates substantially within the range of 0 to 60. The welding is finished at 6 seconds.

FIG. 9 shows the fluctuation (the standard deviation) of the moving average value at each time T. The fluctuation temporarily fluctuates greatly from directly after starting the welding to the vicinity of 0.6 seconds. Then, the fluctuation is substantially within the range of 5 to 30.

The processing device 10 compares the fluctuation to a preset determination condition. As a specific example, the determination condition includes a threshold. The processing device 10 determines whether or not the fluctuation is less than the preset threshold (step St215). When the fluctuation is less than the threshold, the processing device 10 determines the weld to be in the first state (step St216). When the fluctuation is not less than the threshold, the processing device 10 determines the weld to be in the second state (step St217). Thus, step St2 of the flowchart shown in FIG. 3 ends.

FIG. 10 shows the same graph as FIG. 9. As an example, a threshold TH is set at V=17 as shown in FIG. 10. As a result, the weld is determined to be in a second state S2 at the vicinity of 0.7 seconds, the vicinity of 1.2 seconds, the vicinity of 1.9 seconds, the vicinity of 2.8 seconds, the vicinity of 3.6 seconds, the vicinity of 4.2 seconds, and 5.0 seconds to 5.8 seconds. The weld is determined to be in the first state in the other periods. The welding parameter is corrected when the weld is determined to be in the second state. The fluctuation V can be reduced when the weld state is improved by the correction of the welding parameter.

Second Determination Method

In a second determination method, the state of the weld is determined using a model. The model outputs a classification of the weld state according to the input of the image of the weld pool. It is favorable for the model to include a neural network on which supervised learning is performed.

Figure 11:
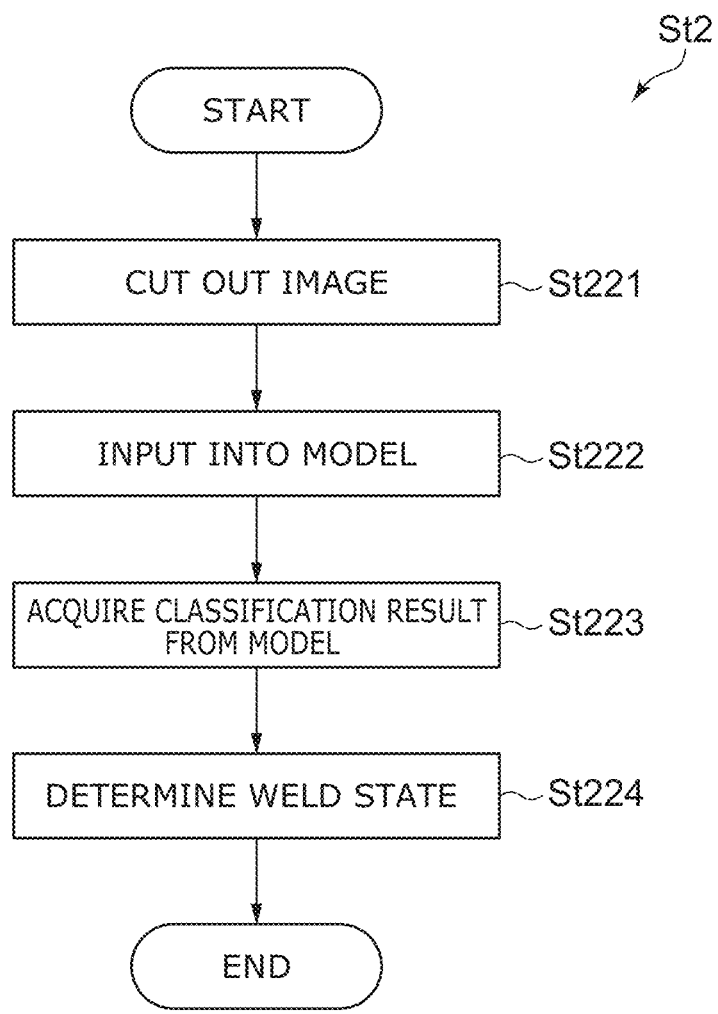
FIG. 11 is a flowchart showing a second determination method according to the processing device according to the embodiment.

FIG. 11 is a flowchart showing the second determination method according to the processing device according to the embodiment.

First, processing devices 10 cuts out a portion of the image acquired by the imaging device 40 (step St221). Specifically, the processing device 10 cuts out a portion of the weld pool positioned directly under the heat source.

Figure 12:
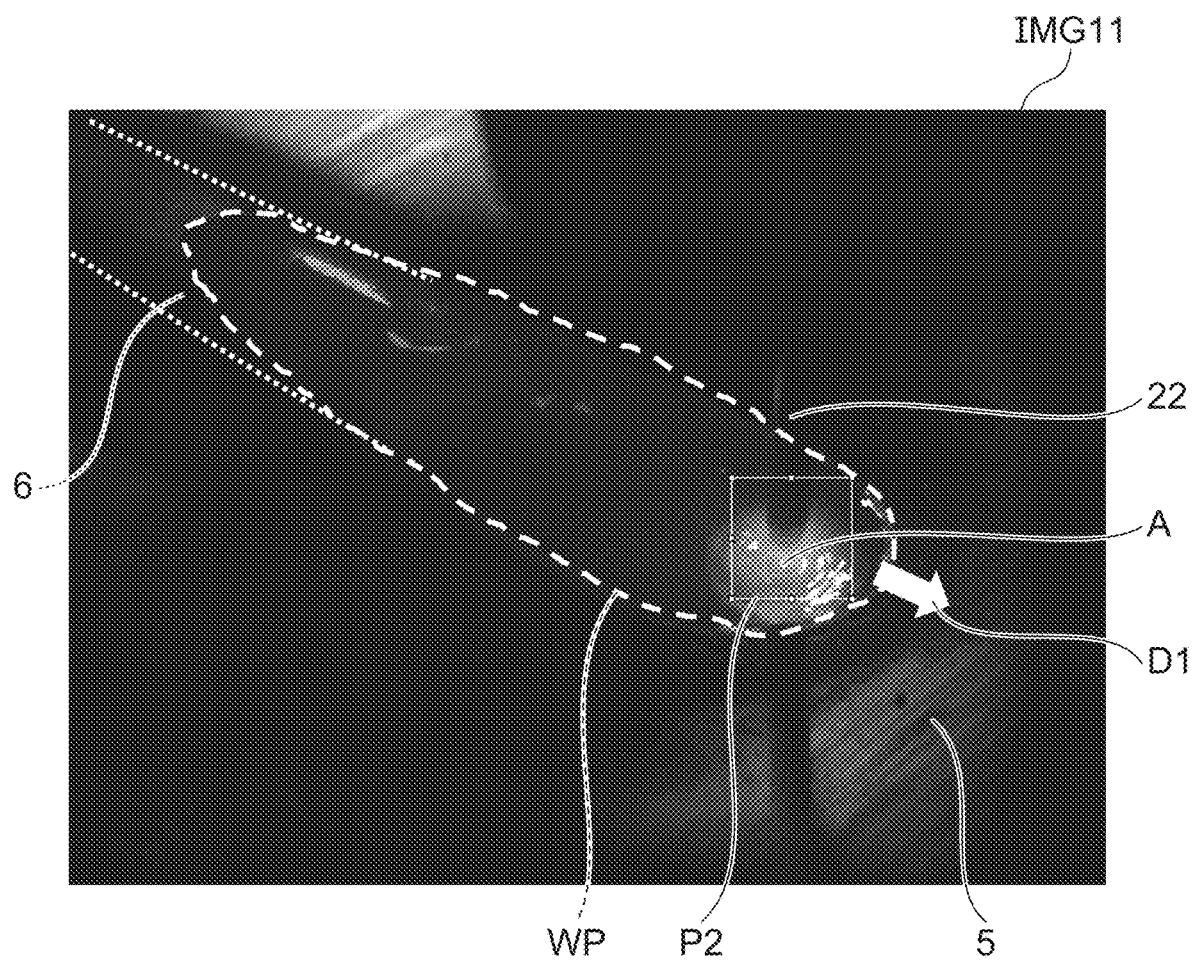
FIG. 12 is one examples of the image acquired by the imaging device.
Figure 13:
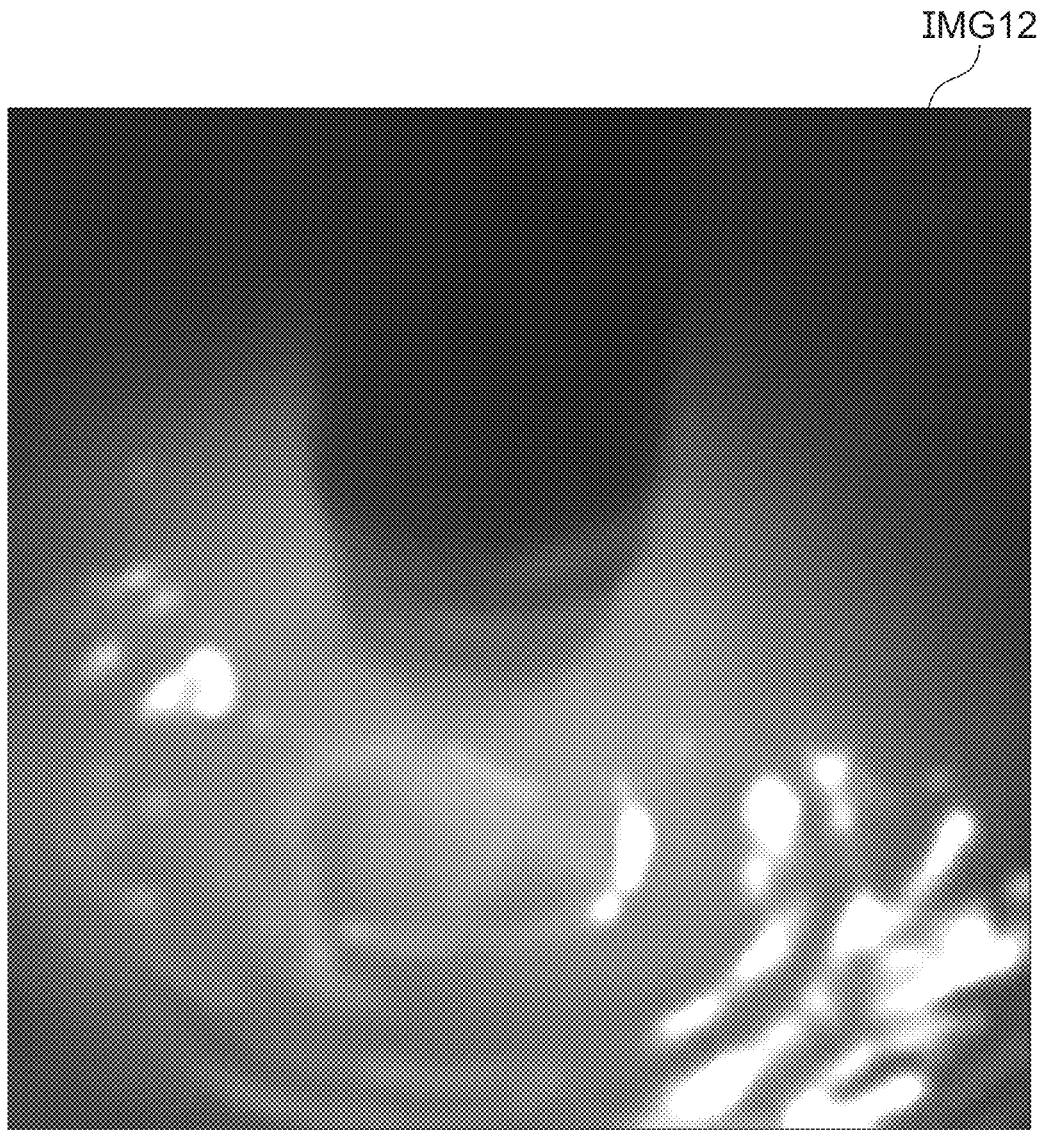
FIG. 13 is one examples of the image acquired by the imaging device.

FIGS. 12 and 13 are examples of the image acquired by the imaging device.

Similarly to the image IMG1, an image IMG11 (an example of the second image) shown in FIG. 12 includes the wire 22, the arc A (the heat source), the weld pool WP, and the solidified layer 6. The wire 22 and the arc A move in the direction D1. The image of a portion P2 directly under the arc A is cut out. FIG. 13 shows an image IMG12 (an example of the first image) of the portion P2 that is cut out.

The processing device 10 inputs the cut-out image to the model (step St222). The model classifies the state of the weld. The processing device 10 acquires the classification result from the model (step St223). The processing device 10 determines the weld state based on the classification result (step St224). For example, the classification result from the model indicates the probability of each of the first and second states. When the probability of the first state is greater than the probability of the second state, the processing device 10 determines the weld to be in the first state. When the probability of the second state is greater than the probability of the first state, the processing device 10 determines the weld to be in the second state. Thus, step St2 of the flowchart shown in FIG. 3 ends.

Advantages of the embodiments will now be described.

Defects such as sputtering, pits, undercut, etc., may occur when welding. It is favorable for the degree and number of the defects to be low. To suppress the occurrence of defects, conventionally, it has been attempted to use information obtained when welding to correct a welding parameter. The information that can be used to determine the necessity of the correction also has been investigated. Investigations by the inventors led to the discovery that directly before the occurrence of pits in particular, the waves that form in the weld pool become large, and ripples occur in the weld pool. Based on this knowledge, the inventors invented the method of determining the necessity of the welding parameter according to the occurrence of the ripples.

Figure 14A:
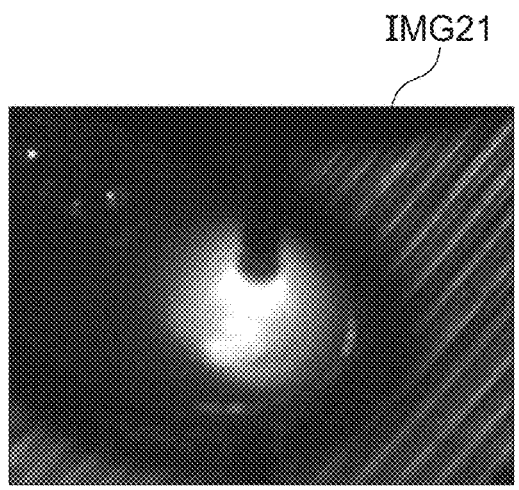
FIG. 14A, FIG. 14C, and FIG. 14E are examples of images of weld pools.
Figure 14B:
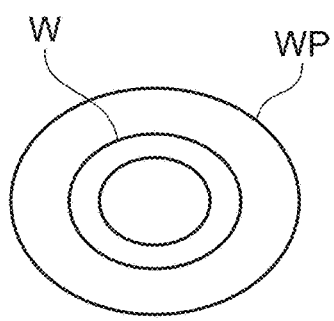
FIG. 14B, FIG. 14D, and FIG. 14F are schematic views respectively showing the states of the weld pools of FIG. 14A, FIG. 14C, and FIG. 14E.
Figure 14C:
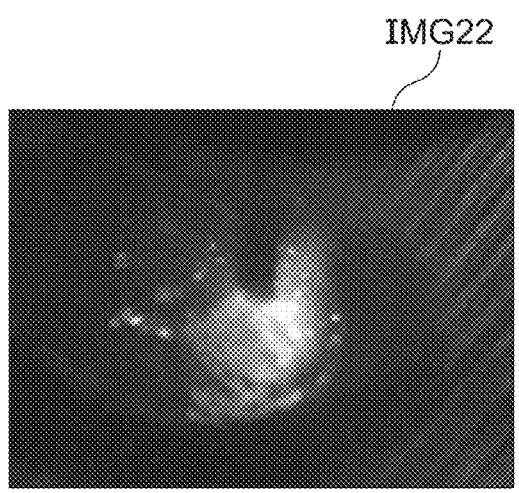
Figure 14D:
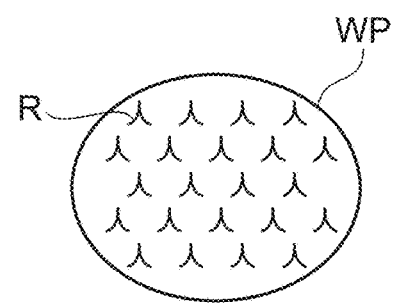
Figure 14E:
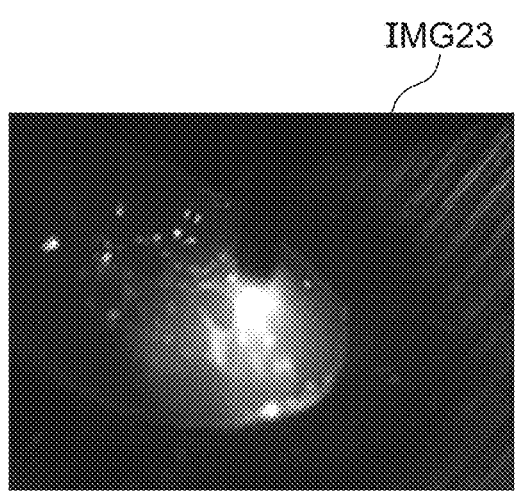
Figure 14F:
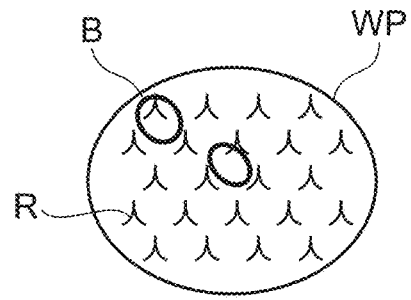

FIG. 14A, FIG. 14C, and FIG. 14E are examples of images of weld pools. FIG. 14B, FIG. 14D, and FIG. 14F are schematic views respectively showing the states of the weld pools of FIG. 14A, FIG. 14C, and FIG. 14E.

In an image IMG21 of FIG. 14A, a small wave W due to the drop of the melted wire 22 gradually spreads in a concentric circular configuration in the weld pool WP as shown in FIG. 14B. Ripples substantially do not exist in the weld pool WP. In an image IMG22 of FIG. 14C, much unevenness exists in the weld pool WP. Compared to the image IMG21, waves form in the surface of the weld pool WP; and many ripples R occur as shown in FIG. 14D. In an image IMG23 of FIG. 14E, similarly to the image IMG22, much unevenness exists in the weld pool WP. Moreover, even larger ripples R occur in the surface of the weld pool WP in the image IMG23 due to bubbles B as shown in FIG. 14F.

The orientation of the reflected light is substantially uniform in portions without ripples. Therefore, the change of the pixel value is small in portions without ripples. On the other hand, the orientation of the reflected light changes at the vicinity of the ripples. The change of the pixel value in the image is larger at the vicinity of the ripples than at portions without ripples. As a result, for example, the average value of the pixel values of the image IMG22 is greater than the average value of the pixel values of the image IMG21. An image in which the pixel values change is identified by calculating the moving average between the multiple images and by calculating the fluctuation of the moving average. In other words, the images in which ripples exist in the weld pool WP are identified. As a result, the weld is determined to be in the second state when ripples exist in the weld pool WP of the image.

Other than pixel values, the state of the weld can be determined by classifying the state of the weld pool by using a model as well. When training the model, images without ripples such as that shown in FIG. 14A and images with ripples such as those shown in FIGS. 14C and 14E are prepared beforehand. The model is trained using the images and the classification results (the teaching data) of the state. Thereby, the weld is classified as the second state for the images in which ripples exist in the weld pool WP.

By correcting the welding parameter when ripples exist, the occurrence of defects (particularly pits) can be suppressed, and the degree and the number of the defects can be reduced. For example, according to the embodiment, the occurrence of welding defects can be suppressed, and the quality of the joined body can be improved.

It is favorable for the welding parameter that is corrected to include the voltage value, the current value, the current waveform, or the shielding gas flow rate. Investigations by the inventors confirmed correlations between these conditions and the occurrence of ripples. Specifically, when the weld is determined to be in the second state, the processing device 10 performs at least one selected from the group consisting of increasing the voltage value, increasing the current value, and increasing the shielding gas flow rate.

It is considered that the voltage value, the current value, or the shielding gas has a relationship with the weld state for the following reasons. The weld pool is more easily exposed to air when the flow rate of the shielding gas is low. As a result, components of the air easily penetrate the weld pool. When air components penetrate the weld pool, pits may be caused when a portion of the components inside the weld pool when cooling is discharged as a gas. The exposure of the weld pool to the air can be reduced by increasing the shielding gas flow rate. The heat amount input to the weld pool increases when the current or the voltage is increased. The melted state of the weld pool is maintained longer thereby, which promotes the discharge of gas and suppresses the occurrence of pits.

After correcting of the welding parameter, the welding may be continued at the corrected welding parameter. Or, when the subsequent weld is determined to be in the first state, the welding parameter may be modified from the value after correcting to the value of the preset standard.

It is favorable for the processing device 10 not to determine the state based on the images from the start of the welding until a first time has elapsed. Or, the processing device 10 ignores the determination result obtained from the start of the welding until the first time has elapsed. In any case, the welding parameter is not corrected regardless of the state of the weld. For example, as shown in FIG. 9, the fluctuation V is large until 0.8 seconds due to the fluctuation of the size of the weld pool directly after starting welding. The time from 0 seconds to 0.8 seconds is an example of the first time. There is a possibility that the welding parameter may be uselessly corrected if the weld state is determined based on the images from 0 seconds to 0.8 seconds. There is also a possibility that the stability of the weld may degrade. The stability directly after starting welding can be improved by not correcting the welding parameter based on the determination result during the first time.

The first time may be preset by the user. Or, the first time may be set based on data obtained from the images. For example, the timing at which the fluctuation V first falls below the threshold TH after first exceeding the threshold TH is set as the end point of the first time. When a model is used, the timing at which the weld state is first classified as the first state after the weld state is first classified as the second state is set as the end point of the first time.

In the welding device 20, the torch 24 may be gripped by the hand of a human or may be held by a machine. It is favorable for the torch 24 to be held by a machine.

Figure 15:
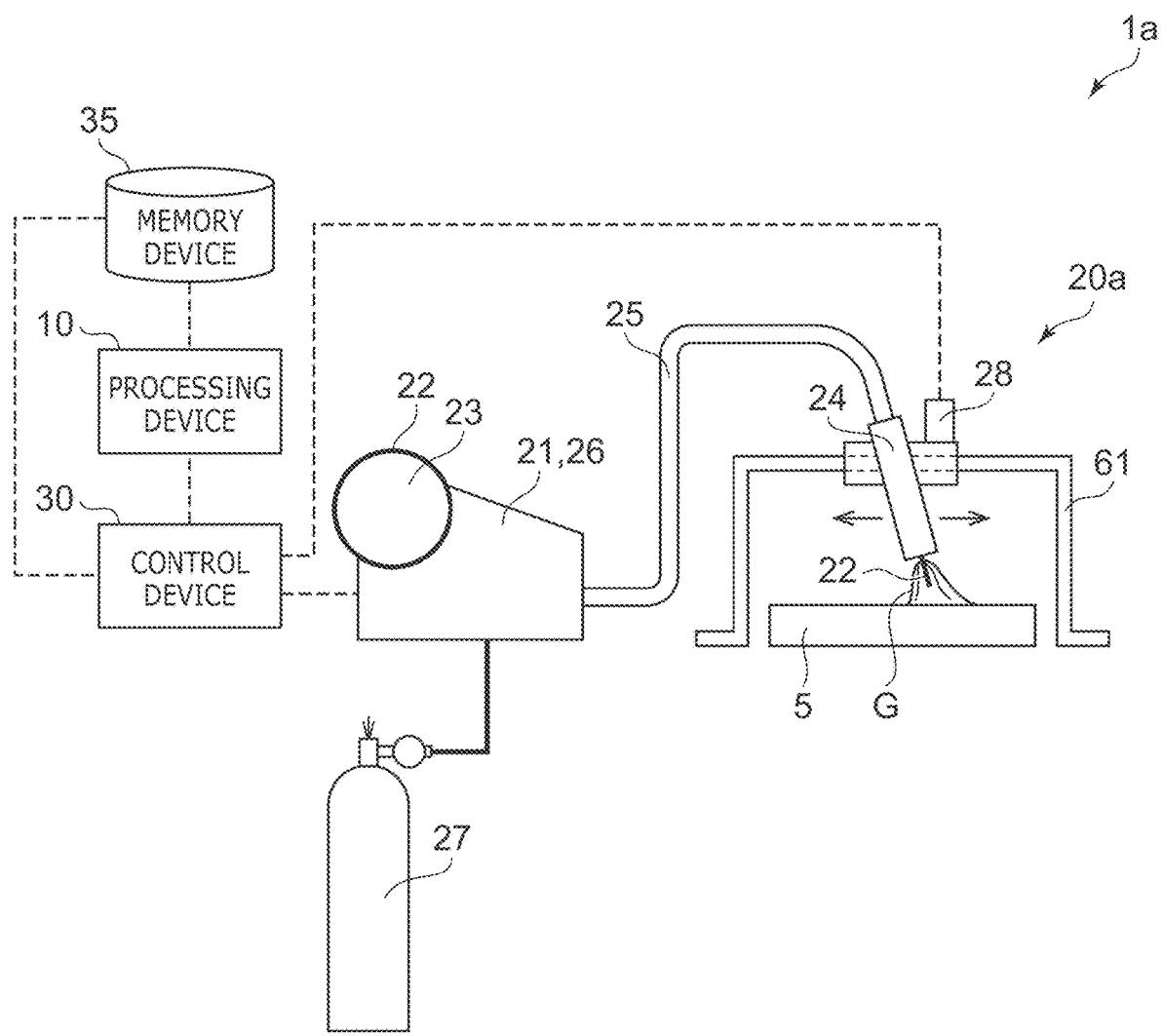
FIG. 15 is a schematic view showing another welding system according to the embodiment.

FIG. 15 is a schematic view showing another welding system according to the embodiment.

In the welding system 1a shown in FIG. 15, the welding device 20 further includes a moving device 28. In the example shown in FIG. 15, one device is provided as the wire supplier 21 and the gas supplier 26. The imaging device 40 and the lighting 50 are not illustrated.

The moving device 28 includes a not-illustrated actuator. The moving device 28 is controlled by the control device 30 and moves the torch 24. The torch 24 performs the welding while moving with respect to the members 5. An X-Y orthogonal robot, a horizontal articulated robot, or a vertical articulated robot may be used as the moving device 28.

The not-illustrated imaging device 40 and the not-illustrated lighting 50 also move synchronously with the torch 24. In the welding system 1a as well, similarly to the welding system 1, the state of the weld is determined using the images when welding; and the welding parameter is appropriately corrected. The degree and the number of the defects can be reduced thereby.

Examples are described above in which arc welding is performed as the welding. The embodiment is also applicable to laser welding. In laser welding as well, a weld pool is formed at the portion of the members 5 on which the laser (the heat source) is irradiated. The stability of the weld can be improved by correcting the welding parameter according to the existence or absence of ripples in the weld pool.

Other than a determination based on pixel values of an image, the state of the weld may be determined using the intensity distribution of reflected light of laser light. For example, the lighting 50 irradiates laser light on the weld pool WP. The laser light is reflected by the weld pool. Instead of the imaging device 40, a light-receiving device that receives the reflected light is included. The light-receiving device generates an intensity distribution of the reflected light and transmits the intensity distribution to the processing device 10. The processing device 10 determines the state of the weld from the periodicity of the intensity distribution.

Or, the state of the weld may be determined using the intensity distribution of infrared light from the weld pool. For example, a thermal camera is used as the imaging device 40. The thermal camera detects infrared light radiated from the weld pool. The thermal camera generates an intensity distribution of the infrared light and transmits the intensity distribution to the processing device 10. The processing device 10 determines the state of the weld from the periodicity of the intensity distribution.

Figure 16:
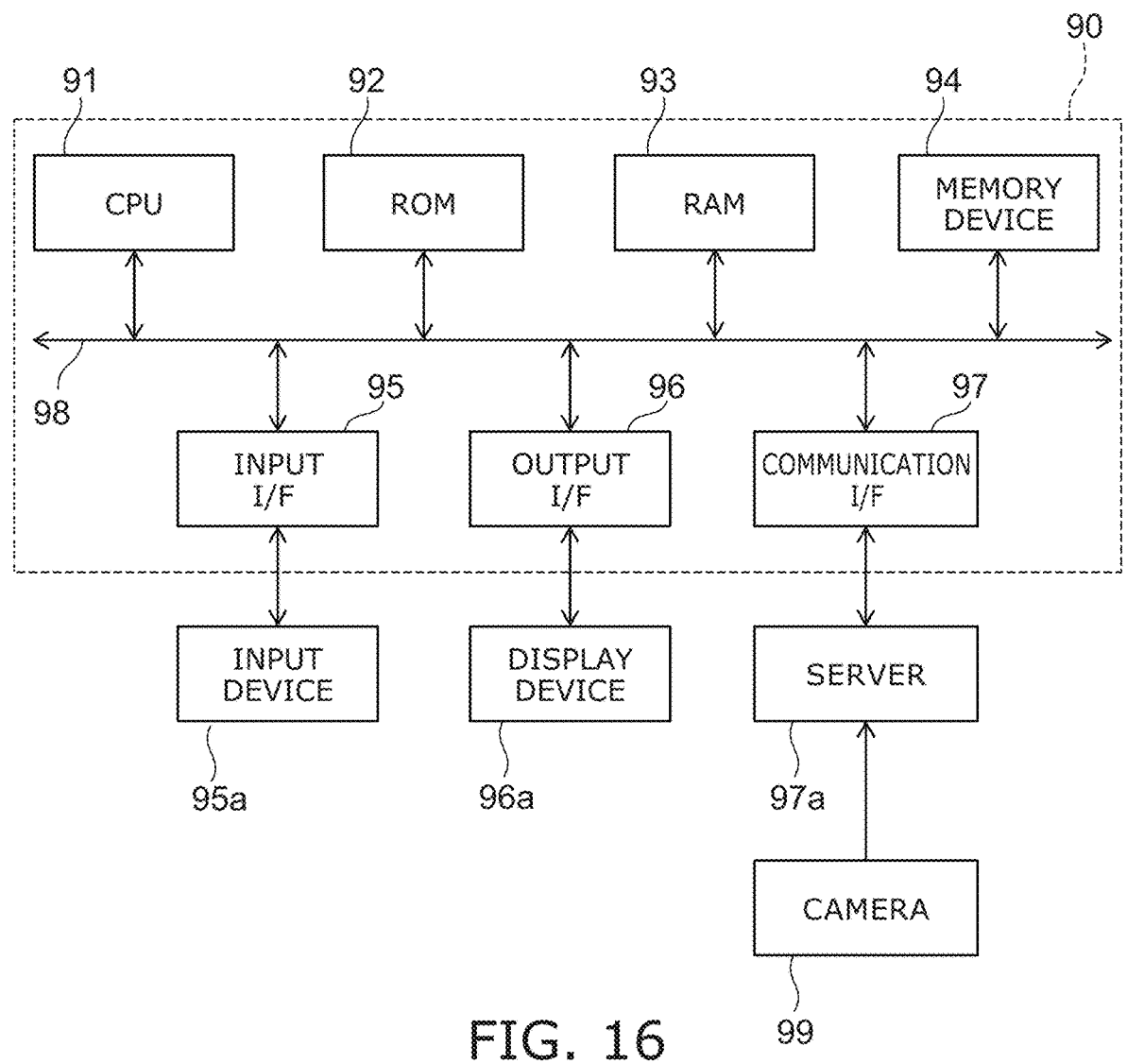
FIG. 16 is a schematic view showing a hardware configuration.

FIG. 16 is a schematic view showing a hardware configuration.

The processing device 10 and the control device 30 each are realized by a general-purpose or dedicated computer. The functions of the processing device 10 and the control device 30 may be realized by the collaboration of multiple computers. The processing device 10 and the control device 30 each include, for example, the hardware configuration illustrated in FIG. 16.

A computer 90 shown in FIG. 16 includes a CPU 91, ROM 92, RAM 93, a memory device 94, an input interface 95, an output interface 96, and a communication interface 97.

The ROM 92 stores programs that control the operations of a computer. Programs that are necessary for causing the computer to realize the processing described above are stored in the ROM 92. The RAM 93 functions as a memory region into which the programs stored in the ROM 92 are loaded.

The CPU 91 includes a processing circuit. The CPU 91 uses the RAM 93 as work memory to execute the programs stored in at least one of the ROM 92 or the memory device 94. Of executing the programs, the CPU 91 executes various processing by controlling configurations via a system bus 98.

The memory device 94 stores data necessary for executing the programs and/or data obtained by executing the programs. The memory device 94 functions as the memory device 35.

The input interface (I/F) 95 connects the computer 90 and an input device 95a. The input I/F 95 is, for example, a serial bus interface such as USB, etc. The CPU 91 can read various data from the input device 95a via the input I/F 95.

The output interface (I/F) 96 connects the computer 90 and a display device 96a. The output I/F 96 is, for example, an image output interface such as Digital Visual Interface (DVI), High-Definition Multimedia Interface (HDMI (registered trademark)), etc. The CPU 91 can transmit the data to the display device 96a via the output I/F 96 and cause the display device 96a to display an image.

The communication interface (I/F) 97 connects the computer 90 and a server 97a that is outside the computer 90. The communication I/F 97 is, for example, a network card such as a LAN card, etc. The CPU 91 can read various data from the server 97a via the communication I/F 97. A camera 99 images the weld pool and stores the image in the server 97a. The camera 99 functions as the imaging device 40.

The memory device 94 includes at least one selected from a hard disk drive (HDD) and a solid state drive (SSD). The input device 95a includes at least one selected from a mouse, a keyboard, a microphone (audio input), and a touchpad. The display device 96a includes at least one selected from a monitor and a projector. A device such as a touch panel that functions as both the input device 95a and the display device 96a may be used.

The processing of the various data described above may be recorded, as a program that can be executed by a computer, in a magnetic disk (a flexible disk, a hard disk, etc.), an optical disk (CD-ROM, CD-R, CD-RW, DVD-ROM, DVD±R, DVD±RW, etc.), semiconductor memory, or a recording medium (a non-transitory computer-readable storage medium) that can be read by another nontemporary computer.

For example, the information that is recorded in the recording medium can be read by a computer (or an embedded system). The recording format (the storage format) of the recording medium is arbitrary. For example, the computer reads the program from the recording medium and causes the CPU to execute the instructions recited in the program based on the program. In the computer, the acquisition (or the reading) of the program may be performed via a network.

According to embodiments described above, a processing device, a welding system, a processing method, a program, and a storage medium are provided in which the occurrence of defects of a weld can be suppressed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention. The above embodiments can be practiced in combination with each other.

What is claimed is:

1. A processing device,
the processing device performing at least determination processing of determining a state of a weld by using a first image of at least a portion of a weld pool, the weld pool being liquid and including melted metal,
the state including
a first state, and
a second state that is more unstable than the first state,
the determination processing determining the weld to be in the second state when ripples exist in the weld pool,
the processing device correcting a condition of the weld when the weld is determined to be in the second state,
the processing device not correcting the condition of the weld when the weld is determined to be in the first state,
wherein the processing device calculates an evaluation value based on a pixel value of the first image, and the state is determined by comparing the evaluation value to a preset determination condition,
wherein the calculating of the evaluation value includes:
calculating a first value of a plurality of the pixel values of the first image, the first value being an average, a sum, or a weighted average; and
calculating a moving average and a fluctuation of the first values of a plurality of the first images, and
wherein the fluctuation is used as the evaluation value.

2. The processing device according to claim 1, wherein the processing device generates the first image by cutting out a portion of the weld pool from a second image of the weld pool, and
the cut-out portion of the weld pool is positioned backward of a heat source.

3. The processing device according to claim 1, wherein the evaluation value is calculated from the first image to which edge enhancement or edge detection is applied.

4. The processing device according to claim 1, wherein the processing device acquires a classification result of the state by inputting the first image to a model, the model outputting a classification of a weld state according to an input of an image, and
the processing device determines the state based on the classification result.

5. The processing device according to claim 4, wherein the processing device generates the first image by cutting out a portion of the weld pool from a second image of the weld pool, and
the cut-out portion of the weld pool is positioned directly under a heat source.

6. The processing device according to claim 1, wherein the processing device does not correct the condition regardless of a determination result of the state until a first time has elapsed from a start of the weld.

7. The processing device according to claim 1, wherein the weld pool of arc welding is imaged in the first image, and the corrected condition is at least one selected from the group consisting of a current value, a voltage value, a current waveform, and a shielding gas flow rate.

8. A welding system, comprising:
the processing device according to claim 1;
an imaging device acquiring the first image; and
a control device causing a welding device to perform the weld by using the corrected condition.

9. The welding system according to claim 8, further comprising:
lighting that irradiates light on the weld pool; and
an optical filter located in an optical path between the weld pool and the imaging device,
the optical filter selectively transmitting light of a prescribed wavelength region.

10. The welding system according to claim 8, further comprising:
the welding device performing the weld by using the corrected condition.

11. A processing method, comprising:
determination processing of determining a state of a weld by using a first image of at least a portion of a weld pool, the state including a first state and a second state, the second state being more unstable than the first state, the determination processing determining the weld to be in the second state when ripples exist in the weld pool, the weld pool being liquid and including melted metal;
correcting a condition when the weld is determined to be in the second state;
not correcting the condition of the weld when the weld is determined to be in the first state
calculating an evaluation value based on a pixel value of the first image, and the state is determined by comparing the evaluation value to a preset determination condition,
wherein the calculating of the evaluation value includes:
calculating a first value of a plurality of the pixel values of the first image, the first value being an average, a sum, or a weighted average; and
calculating a moving average and a fluctuation of the first values of a plurality of the first images, and
wherein the fluctuation is used as the evaluation value.

12. A storage medium storing a program,
the program causing a computer to execute the processing method according to claim 11.

13. A processing device,
the processing device performing at least determination processing of determining a state of a weld by using a first image of at least a portion of a weld pool,
the state including
a first state, and
a second state that is more unstable than the first state,
the determination processing determining the weld to be in the second state when ripples exist in the weld pool,
the processing device correcting a condition of the weld when the weld is determined to be in the second state,
the processing device not correcting the condition of the weld when the weld is determined to be in the first state, wherein
the processing device calculates an evaluation value based on a pixel value of the first image,
the state is determined by comparing the evaluation value to a preset determination condition,
the calculating of the evaluation value includes:
calculating a first value of a plurality of the pixel values of the first image, the first value being an average, a sum, or a weighted average; and
calculating a moving average and a fluctuation of the first values of a plurality of the first images, and
the fluctuation is used as the evaluation value.

* * * * *